PLURAL FREQUENCY COMMAND ENCODER SYSTEM UTILIZING A MATRIX SELECTOR AND LINEAR MIXER

Filed May 19, 1967 4 Sheets-Sheet 1

INVENTORS.
GARY D. CLAPP,
FRED MACRENO, JR.
and DONALD R. WILLIS
BY
H. W. Loecke
Attorney INVENTORS.
GARY D. CLAPP,
FRED MACRENO, JR.
and DONALD R. WILLIS
H. H. Losche
Attorney INVENTORS.
GARY D. CLAPP,
FRED MACRENO, JR.
and DONALD R. WILLIS
H. H. Losche
Attorney INVENTORS.
GARY D. CLAPP,
FRED MACRENO, JR. and
DONALD R. WILLIS H. H. Losche
Attorney United States Patent Office 3,495,219

Patented Feb. 10, 1970

3,495,219

PLURAL FREQUENCY COMMAND ENCODER SYSTEM UTILIZING A MATRIX SELECTOR AND LINEAR MIXER

Gary D. Clapp and Fred Macreno, Jr., Indianapolis, and Donald R. Willis, Fort Wayne, Ind., assignors to the United States of America as represented by the Secretary of the Navy Filed May 19, 1967, Ser. No. 641,430
Int. Cl. H04q *1/00, 11/02*
U.S. Cl. 340—171 10 Claims

ABSTRACT OF THE DISCLOSURE

Al electronic interrogator for generating coded command signals to selectively activate and interrogate any one of a large group of remotely located electronic data gathering devices, such as automatic meteorological station. The interrogator includes a keyboard of manually positioned switches coupled to a selection matrix and a group of oscillator gating means, for controlling the selection of a fixed number of tone generating oscillators from a larger group, in response to information entered upon the keyboard. A modulation control circuit is coupled to each of the oscillator gating means which, when manually actuated, causes the output signals from each of the selected tone generting oscillators to be applied to a mixer circuit where they are linearly summed to produce a composite tone coded interrogation signal, which is applied through a driver circuit to a transmitter for transmitting to the various devices to be interrogated.

The invention described herein may be manufactured and used by or for the Government of the United States of America for governmental purposes without the payment of any royalties thereon or therefor.

BACKGROUND OF THE INVENTION

This invention is in the field of frequency selective electrical communications devices for remote control applications.

The broad concept of supervisory control over remotely located electromechanical and electronic devices through the transmission of radio signals is well known in the art. A few of the present day devices applying this concept include remotely controlled television receivers, electronic garage door controls, and model airplanes in the commercial area, while industrial applications include supervisory control of remotely located radio, television, and microwave transmission equipment. However, these and other known control devices of the prior art usually provide only a single or, at most, a few channels, tones, or other discriminating selection means, thereby greatly limiting the number of remotely located devices which each may selectively control.

In the area of remotely located meteorological stations which automatically obtain various weather data for transmission, upon command, to a single conveniently located control position, a need has arisen for an interrogation device capable of producing the command signals to selectively interrogate any one of a large group of such meteorological stations at any desired time. The present invention fulfills that need.

SUMMARY OF THE INVENTION

In the present invention an array of manually actuated control switches are coupled to a selection matrix and a group of oscillator gating means, which simultaneously select the output signals of a fixed number of tone generating oscillators from a larger group thereof (in the embodiment disclosed herein, 3 of 14) in response to the manual positioning of the array of switches. Each of the tone generating oscillators operates at a different frequency and has its output signal coupled to its respective oscillator gating means. A manually actuated modulation control circuit is coupled in common to each of the oscillator gating means. After selection of the desired tone generating oscillators by actuation of the proper control switches from the array thereof, the modulation control circuit is manually actuated which produces a gating signal allowing the output signals from each of the selected tone generating oscillators to be applied to a mixer circuit. The mixer circuit linearly sums these selected output signals to produce a composite tone coded interrogation signal, which is applied through a driver circuit to transmitting equipment to be combined with a carrier for transmission to the remote devices, to interrogate that one of all the devices which will respond to the particular composite signal being transmitted.

In a specific one of many possible control applications, the present invention produces the selective interrogate or "command-on" signals for a large group of automatic remote meteorological stations. Each such station contains a command receiver, and all such receivers are tuned to a single carrier channel corresponding to the carrier frequency of the transmitter. Each command receiver contains three-tone resonant reed decoder circuitry which will cause its particular station to transmit or "read out" its accumulated meteorological data to the single control position upon receipt from the invention of a composite interrogate or "command-on" signal which contains the three tones necessary to actuate its decoder circuitry. Each station in the network has its decoder circuitry constructed to respond to a three-tone composite signal, and is assigned an alpha-numeric call sign comprised of three symbols (i.e. A7G) unique to that particular station. The invention selects the three oscillators having the tones corresponding to a particular station to be interrogated when the call sign of that station is keyed into its array of switches, which are assigned symbols corresponding to those which comprise the various station call signs. When the modulate switch is actuated, the invention generates a composite signal comprised of these three selected tones, which then modulates a transmitter providing a transmitted signal to interrogate or "command-on" the selected station. It is a general object of this invention to provide a rugged, highly reliable, interrogation device capable of producing a plurality of unique command signals to selectively interrogate or control any one of a large group of remote devices at any desired time, while utilizing a minimum number of separate oscillator means.

BRIEF DESCRIPTION OF THE DRAWINGS

These and other objects and the attendant advantages, features and uses of the invention will become more apparent to those skilled in the art as the description proceeds when taken in consideration of the accompanying drawings wherein like reference numerals designate like or corresponding parts throughout the figures thereof, and in which.

DESCRIPTION OF THE PREFERRED EMBODIMENT

Figure 1:
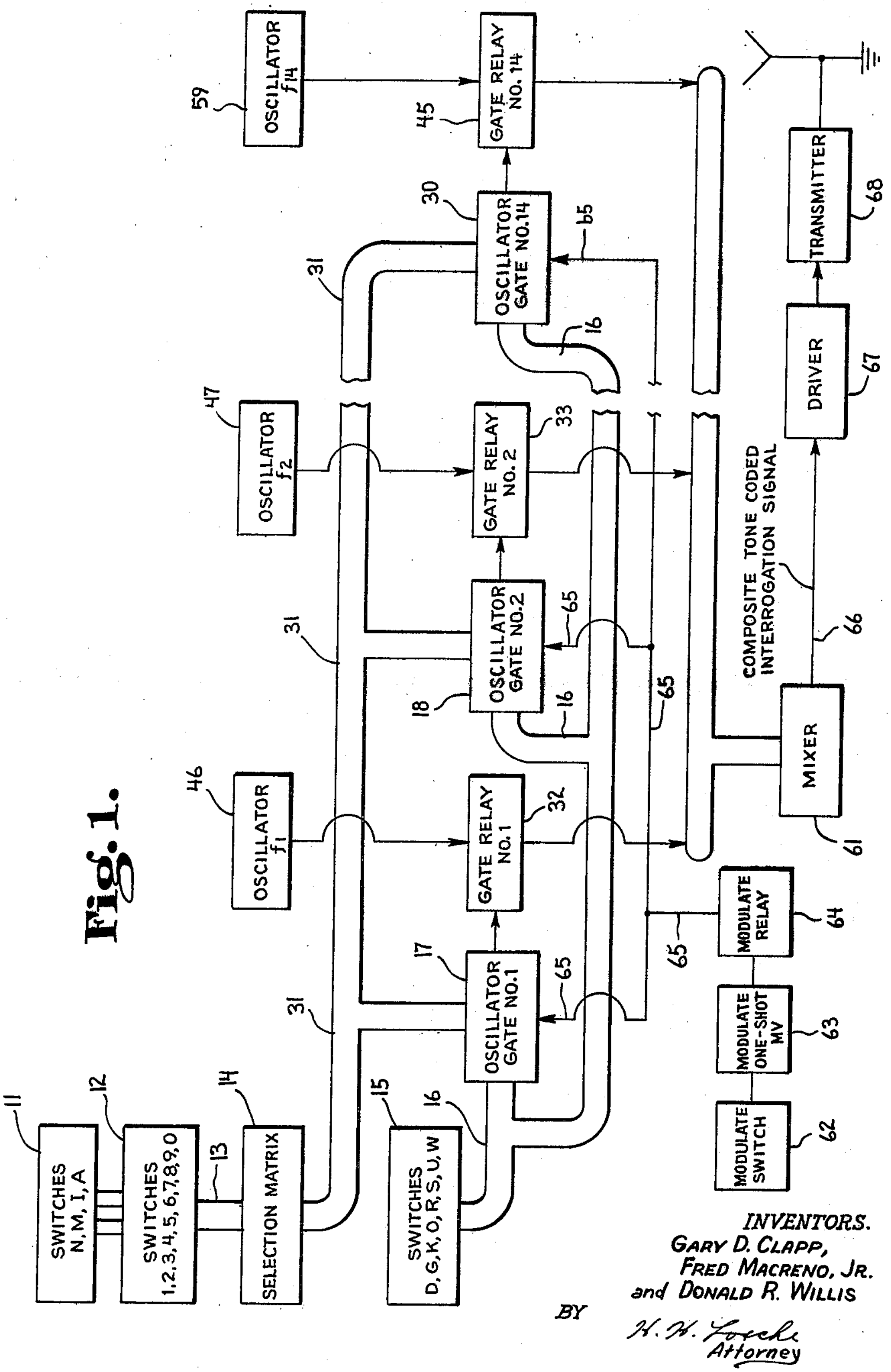
FIGURE 1 is a block diagram of one embodiment of the invention.

Referring more particularly to FIGURE 1, there is shown a block diagram of the invention in which a first switch panel 11 having four manual selection switches is coupled to a second switch panel 12 which is comprised of ten four-gang manual selection switches. For purposes of explanation, the four switches of panel 11 have been designated N, M, I, and A respectively, and the ten four-gang switches of panel 12 have been labeled 1, 2, 3, 4, 5, 6, 7, 8, 9, and 0 respectively. Panels 11 and 12 are used to select the first and second symbols respectively, of the various three symbol alpha-numeric call signs assigned to each of the devices to be interrogated. Second switch panel 12 is coupled by a group of sheathed conducters 13 to a fourteen section diode selection matrix 14. A third switch panel 15 comprised of eight manual selection switches is coupled via a group of sheathed conductors 16 to each of fourteen identical oscillator gate circuits 17 through 30 (only three of which are shown). The eight switches of panel 15 have been designated D, G, K, O, R, S, U, and W respectively, and are used to select the third and final symbol of the alpha-numeric call sign. Each of the oscillator gate circuits 17 through 30 is also coupled to the section of corresponding number in the fourteen section selection matrix 14 by a group of sheathed conductors 31, and each is further coupled to a respective one of the gate relay circuits 32 through 45 (three are shown).

Modulation control circuitry, comprised of a manually actuated "modulate" switch 62, a one-shot multivibrator 63, and a "modulate" relay 64, is coupled via a conductor 65 to each of the oscillator gate circuits 17 through 30, to provide a "modulate" or "enable" signal to all of the oscilaltor gates upon actuation of switch 62. The duration of this "enable" signal is determined by the duty cycle of multivibrator 63, a suitable period being approximately fifteen seconds.

A group of fourteen oscillators or "tone generators" 46 through 59 (three are shown), each operating on a different frequency represented by the symbols $f_1$ through $f_{14}$, are coupled via respective gate relay circuits 32 through 45 to a mixer circuit 61. These oscillators may be of the type disclosed in a United States patent application entitled "Resonant Reed Oscillator," Ser. No. 619,897, which was filed Feb. 28, 1967, by Gary D. Clapp, Fred Macreno, Jr., co-inventors of the present invention, and Donald W. McMillan. Mixer circuit 61 linearly sums the three oscillator signals applied to it via gate relay circuits 32 through 45 to produce a composite interrogation signal which is then applied via a conductor 66 to an amplifying driver circuit 67. The driver circuit 67 is coupled to a transmitter 68, and provides the amplified composite interrogation signal to transmitter 68 where it is transmitted as modulation upon a carrier frequency to which the receiver systems of all devices to be interrogated have been preset.

One-shot multivibrator 63, amplifying driver circuit 67, and transmitter 68 may be of any suitable type, many of which are well known in the art, and disclosure of specific embodiments of these components is not believed to be necessary to understand or practice the invention.

Figure 2:
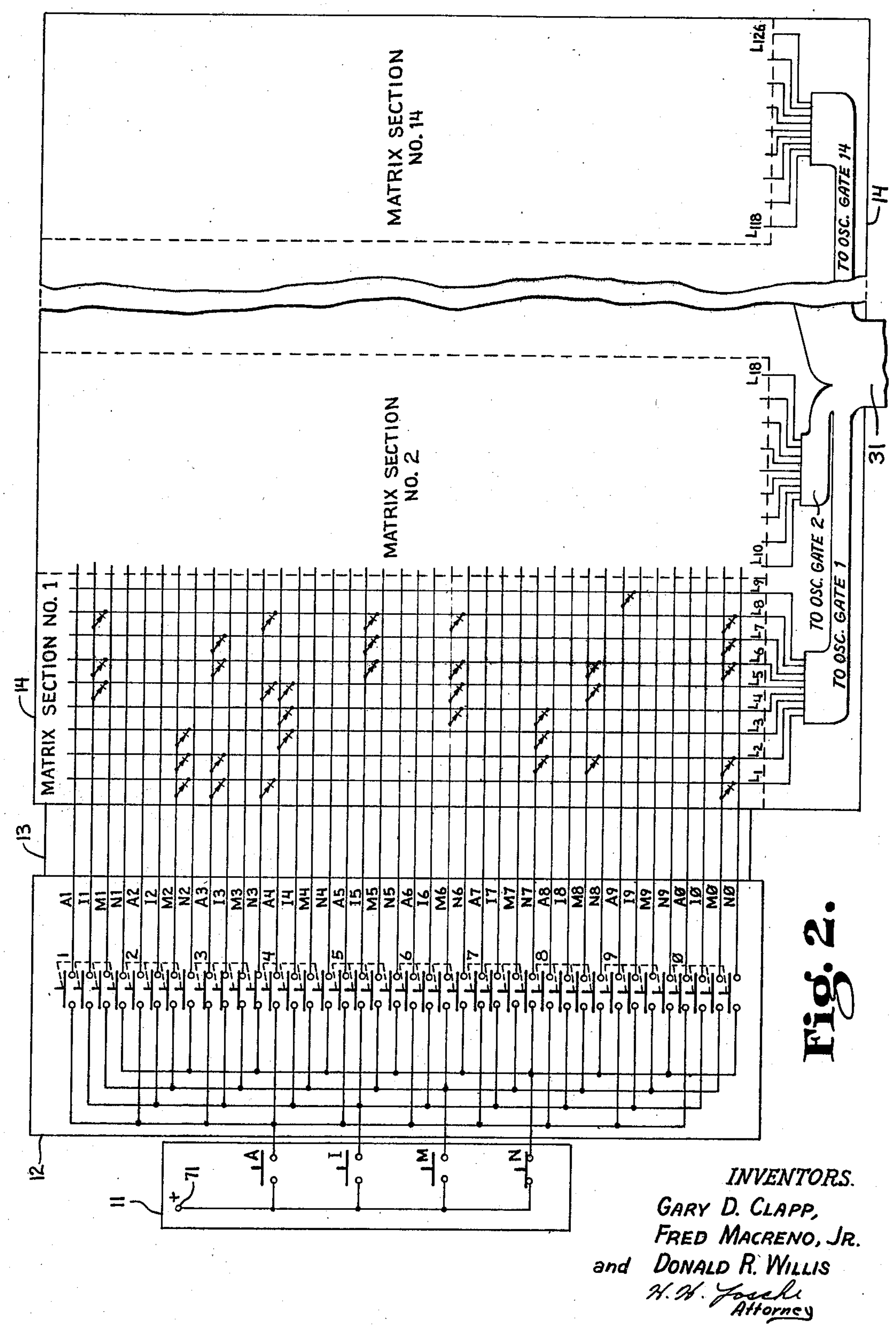
FIGURE 2 is a schematic diagram of portions of the switching and selection matrix sections of FIGURE 1.

Referring now to FIGURE 2, there is shown a schematic diagram of switch panels 11 and 12, and a block-schematic diagram of fourteen section selection matrix 14, in which matrix section 1 is shown schematically in its entirey, and similar sections 2 through 14 are shown in block form, as the showing of specific diode connections therein is not believed to be necessary in order to understand or practice the invention. Switch panel 11 has four manually actuated pushbutton switches which, as previously indicated, have been designated A, I, M, and N for purposes of explanation. These switches all have one terminal coupled in common to a source of positive direct current potential 71, and each has its other terminal coupled to a different one of the four input contacts of each of the ten four-gang manually actuated pushbutton switches labeled 1, 2, 3, 4, 5, 6, 7, 8, 9, and 0 respectively, in switch panel 12. The forty output contacts of these switches of panel 12 (ten switches, 4 sets of contacts per switch) are each coupled, via a group of forty sheathed conductors 13, to a corresponding one of forty horizontal conductors in matrix 14. These forty horizontal conductors extend the entire width of the matrix and are common to each of its fourteen sections. Each section of matrix 14 has a group of nine vertical conductors which for purposes of identification have been designated $L_1$ through $L_9$ for section 1, $L_{10}$ through $L_{18}$ for section 2, etc. Each vertical conductor within a matrix section is coupled to at least one of the forty horizontal conductors by coupling diodes, in accordance with a suitable prearranged logic pattern which will be explained in greater detail as the disclosure progresses. The nine vertical conductors within each section of matrix 14 are coupled by a group of sheathed conductors 31 to the nine conductors of like identification within the oscillator gate circuit whose number corresponds to that of each matrix section.

Figure 3:
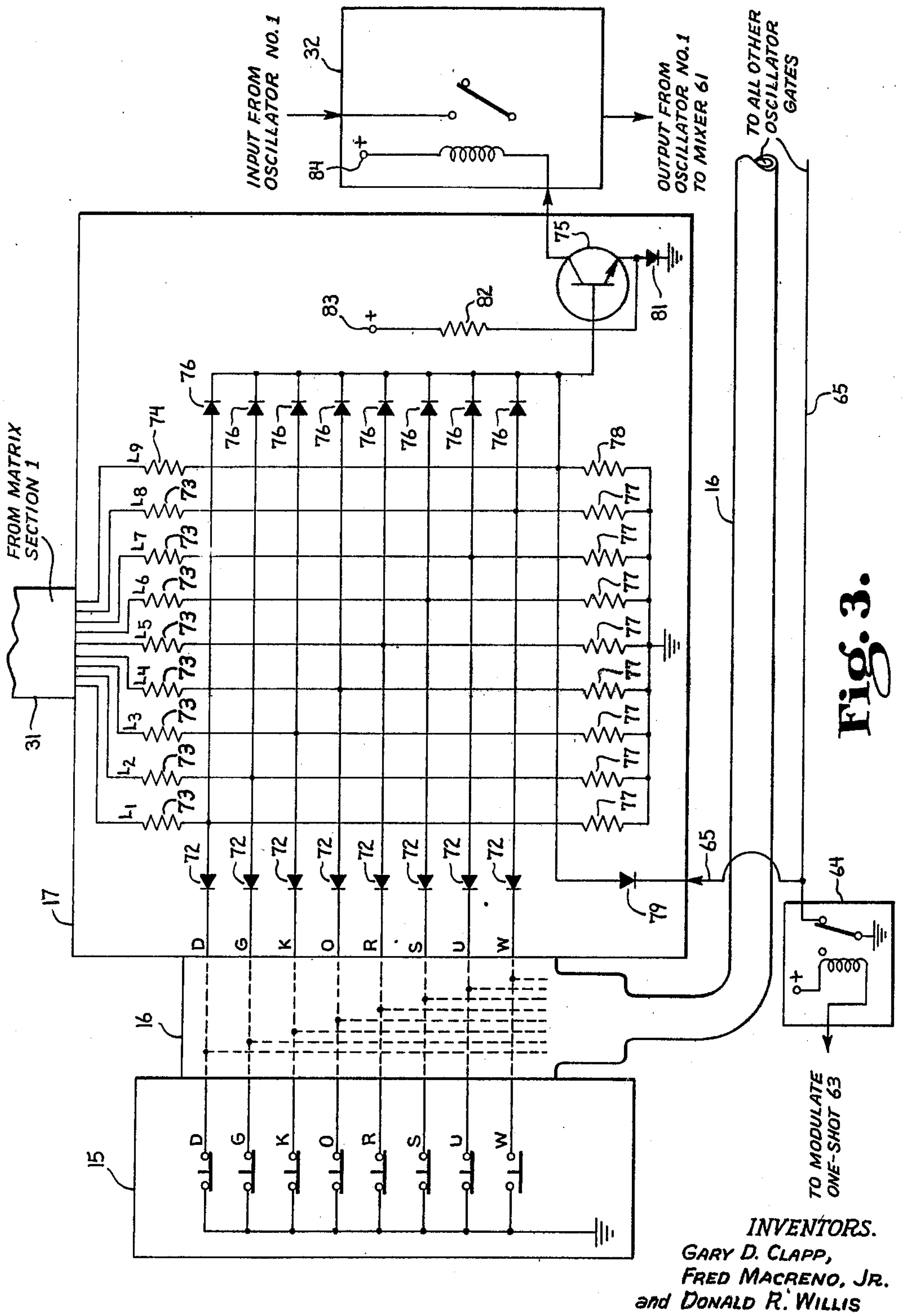
FIGURE 3 is a schematic diagram of another portion of the array of switches, the modulate relay, and an oscillator gate and gating relay of FIGURE 1.

With reference to FIGURE 3, there is shown a schematic representation of switch panel 15, oscillator gate circuit 17, gate relay 32, and modulate relay 64. Switch panel 15 has eight manually actuated pushbutton switches designated D, G, K, O, R, S, U, and W. These switches all have one terminal coupled in common to ground potential, and each has its other terminal coupled via a group of eight sheathed conductors 16 to a horizontal conductor of like designation in each of the fourteen oscillator gate circuits 17 through 30, i.e., switch D has its ungrounded terminal coupled in common to the horizontal conductor D in each of the fourteen oscillator gate circuits. These eight switches of panel 15 are of the "normally closed" type, and open when actuated or depressed, while those of panels 11 and 12 are of the "normally open" type and close when depressed. Oscillator gate circuits 18 through 30 are identical to gate circuit 17 of FIGURE 3, except that in each the nine input lines from selection matrix 14 would be labeled to correspond to the conductors from the particular section in matrix 14 to which they are coupled, i.e., the nine vertical conductors of oscillator gate No. 2 (block 18 of FIGURE 1) would be designated $L_{10}$ through $L_{18}$, those of oscillator gate No. 3 would be $L_{19}$ through $L_{27}$, etc. Within oscillator gate 17, each of these eight horizontal conductors D through W includes a diode 72 having its cathode coupled in the direction of switch panel 15 and its anode coupled via a resistance 73 to a corresponding one of the conductors $L_1$ through $L_8$ from matrix section 1 (i.e., line D to L, line G to $L_2$, etc.). Line $L_9$ from matrix section 1 is coupled via a resistance 74 to the base electrode of a relay gate control transistor 75. Lines $L_1$ through $L_8$ are each coupled via diodes 76 to the base of transistor 75. Lines $L_1$ through $L_8$ are further coupled via resistances 77 to ground potential, while $L_9$ is coupled via resistance 78 to ground potential. The base electrode of transistor 75 is also coupled via a diode 79 and conductor 65 to normally closed modulate relay 64, while its emitter is coupled via a diode 81 to ground potential and via a resistance 82 to a source of positive direct current potential 83. The collector of transistor 75 is coupled to one end of the energizing coil of normally open gate relay 32, the other end of the coil being coupled to a source of positive direct current potential 84. Thus it may be seen that when transistor 75 conducts, the coil of relay 32 will be energized, closing its contact and coupling oscillator 17 directly to its respective one of the fourteen oscillator input lines to mixer circuit 61.

Figure 4:
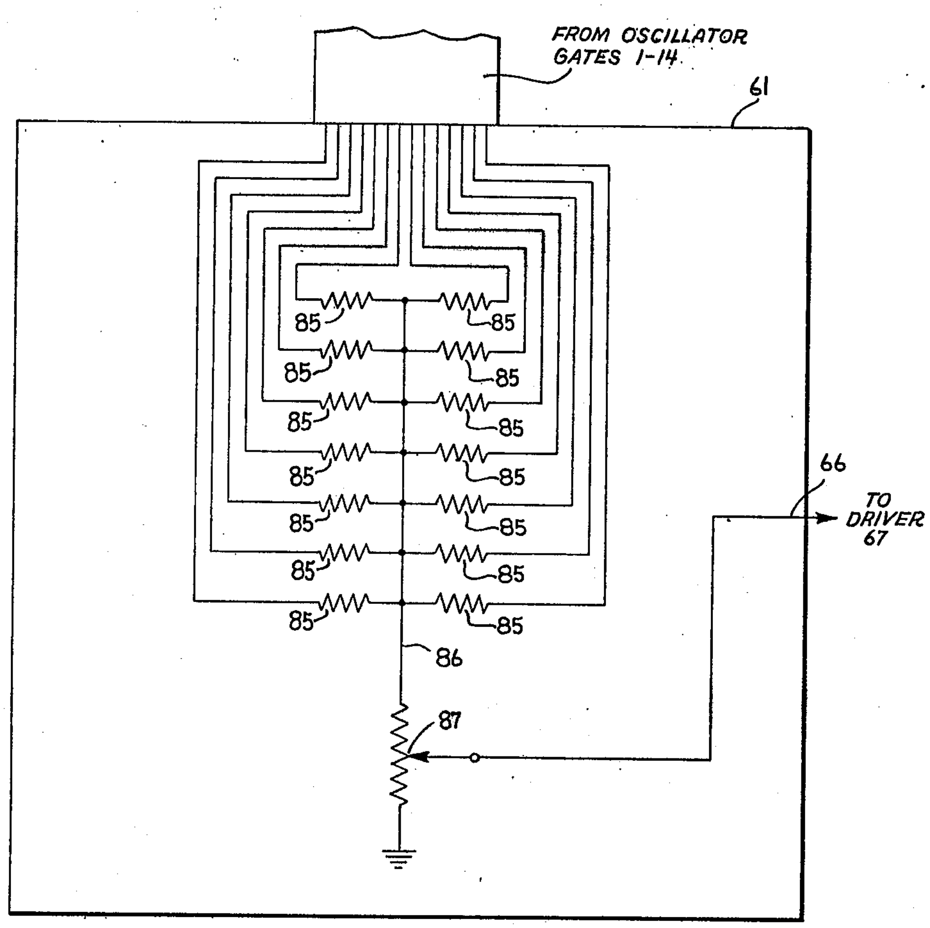
FIGURE 4 is a schematic diagram of the mixer circuit of FIGURE 1.

Referring now to FIGURE 4, there is shown a schematic diagram of mixer circuit 61 which includes an input conductor from each of the fourteen oscillator gate relays 32 through 45. These fourteen input conductors are each coupled via resistances 85 to a common conductor 86 which is coupled to one of the terminals of the fixed resistance portion of a potentiometer 87. The other terminal of the fixed resistance of potentiometer 87 is coupled to ground potential, and the movable contact thereof is coupled to output conductor 66 which couples mixer 61 to a suitable driver circuit 67. Mixer 61 linearly combines the output signals of the three oscillators chosen by the selection circuitry. Potentiometer 87 is utilized as the summing resistance and permits the output of the network to be adjusted in amplitude. This output is the composite three-toned coded interrogation signal produced by the invention in response to a call sign entered on switch panels 11, 12, and 15.

For convenience in specifically describing one operating example of the invention, the following Tables I, II, and III list various elements of FIGURES 2, 3 and 4, respectively, and suitable values and types therefor. While these examples of working embodiments are provided herein, it is to be understood that they are in no way to limit the invention to these values, as other values and other components of a like nature may be utilized for the various elements to accomplish similar results.

TABLE I

| | | |
|---|---|---|
| Potential source **71** | v. D.C. | +16 |
| All matrix diodes | | MC283 |

TABLE II

| | | |
|---|---|---|
| Transistor **75** | | 2N2102 |
| Diodes **72**, **76**, **79**, and **81** | | 1N662 |
| Resistances **73** | ohms | 22,000 |
| Resistance **74** | do | 43,000 |
| Resistances **77** | do | 16,000 |
| Resistance **78** | | 20,000 |
| Resistance **82** | do | 51,000 |
| Potential sources **83** and **84** | v. D.C. | +16 |

TABLE III

| | Ohms |
|---|---|
| Resistances **85** | 75,000 |
| Potentiometer **87** | 10,000 |

OPERATION

For purposes of explanation of the operation of the invention, reference is made to the block diagram of FIGURE 1. The embodiment of the invention is shown therein is capable of producing 320 unique three-tone interrogate or "command-on" signals while utilizing only fourteen separate tones of frequencies, $f_1$ through $f_{14}$, produced by oscillators 46 through 59, thereby enabling the device to selectively interrogate any one of a network of 320 remotely located automatic meteorological stations by actuating a switch in each of switch panels 11, 12, and 15 corresponding to a respective symbol of the particular three-symbol alpha-numeric call sign previously assigned to the station to be interrogated, and then actuating "modulate" switch 62. Actuation of modulate switch 62 causes the three selected oscillators to be coupled to mixer 61 for a period of time to the duty cycle of one-shot multivibrator 63. Mixer 61 linearly sums the signals from the three selected oscillators and produces a unique composite tone coded interrogation signal which is coupled via conductor 66 to driver circuit 67 and transmitter 68 for transmission to all stations in the network. As previously explained, each such station contains a command receiver, and all such receivers are tuned to a single carrier channel corresponding to the carrier frequency of transmitter 68. Each command receiver contains resonant reed decoder circuitry which will cause its particular station to "read out" its accumulated data to the data gathering control position upon receipt from the invention of the interrogate signal containing the unique three tones necessary to actuate its particular decoder circuitry.

In order to explain a specific cycle of operation of the invention, it will be assumed that a particular remote station, for example, Station Number 264 of the 320 stations, has been assigned the alpha-numeric call sign N3W and that its three-tone decoder circuitry has been constructed to be actuated by tones $f_1$, $f_4$, and $f_7$ from oscillators 14, 17, and 20, this assignment being in accordance with a suitable logic pattern which may be established by first assigning a different unique combination of three of the possible fourteen tones ($f_1$–$f_{14}$) to each of the 320 stations to be interrogated, so that the decoder circuitry within the command receiver of each such station may be constructed to respond to its particular unique three-tone signal. Then one of the 320 possible alpha-numeric call signs (i.e., 4 switch symbols in panel 11, 10 switch symbols in panel 12, and 8 switch symbols in panel 15, $4\times10\times8=320$) is assigned to each station and its corresponding three-tone signal. This logic pattern, once established, then determines the placement of coupling diodes within the sections of matrix 14, since a matrix diode must couple the horizontal conductor corresponding to the first two symbols of the call sign to the vertical conductor coupled to the switch in panel 15 corresponding to the third symbol, in each of the three matrix sections which control the three oscillator tones used in that particular call sign, i.e., for a logic pattern in which call sign N3W uses $f_1$, $f_4$, and $f_7$, a diode must couple horizontal conductor N3 to vertical conductor $L_8$ (coupled to switch W) in matrix section 1, another diode must couple the same horizontal conductor N3 to vertical conductor $L_{35}$ in matrix section 4, and another diode must couple the same horizontal conductor N3 to vertical conductor $L_{26}$ in matrix section 7.

Referring now to FIGURES 1, 2, and 3, prior to operation of the invention, all gate relays 32 through 45 will have their contacts in the normally open position, thus none of the oscillators 46 through 59 will be coupled to mixer 61. Also multivibrator 63 will be in its stable state allowing the contacts of modulate relay 64 to remain in their normally closed position, thereby coupling conductor 65, which is common to all oscillator gate circuits 17 through 30, to ground potential. The invention will produce a tone coded signal for selectively interrogating remote Station Number 264 having the alpha-numeric call sign N3W in the following manner. Push-button switches N, 3, and W in switch panels 11, 12, and 15, respectively, would be depressed by the operator, causing the contacts of switches N and 3 to close, while the contacts of switch W will become open thereby. The closing of switches N and 3 (see FIGURE 2) will cause positive potential source 71 to be coupled via the contacts thereof to horizontal conductor N3 which passes through each section (1–14) of selection matrix 14. In matrix section numer 1 (which controls the selection of oscillator 46 producing tone $f_1$), horizontal conductor N3 is coupled via a coupling diode to vertical conductor $L_8$, thereby coupling positive potential source 71, via conductor $L_8$, a resistance 73, and a diode 76 (see FIGURE 3) in oscillator gate circuit 17, to the base electrode of control transistor 75. The other two vertical conductors which are coupled to horizontal conductor N3 by matrix diodes in section 1, $L_1$, and $L_5$, are coupled to ground potential via diodes 72 and normally closed switches D and R respectively, in switch panel 15. These two lines, $L_1$ and $L_5$, must be diode coupled to horizontal conductor N3 because of the coding logic pattern, but they are grounded through switch panel 15 as indicated, except when the invention is being utilized to produce the respective call sign signals N3D and N3R. The positive potential presented to the base of transistor 75 by conductor $L_8$ does not cause it to conduct because the base is held at ground potential via diode 79, conductor 65, and the normally closed contacts of modulate relay 64. Thus so long as the contacts of relay 64 remain closed, the base electrode of transistor 75 (and all like transistors in oscillator gate circuits 18 through 30) will be held at ground potential in a state of nonconduction. This causes the normally open contacts of oscillator gate relay 32 (and all other gate relays) to remain open. However, as soon as the operator has actuated pushbutton switches N, 3, and W causing a positive potential from source 71 to be placed, via matrix 14, upon the base electrodes of the control transistors 75 in oscillator gate circuits 17 (for tone $f_1$), 20 (for tone $f_4$), and 23 (for tone $f_7$), as previously explained for circuit 17, we would actuate "modulate" switch 62 (see FIGURE 1) causing one-shot multivibrator 63 to cycle and pull in modulate relay 64, opening its contacts and ungrounding common control line 65. This permits the potential to rise at the base of control transistors 75 in oscillator gate circuits 17, 20, and 23, causing them to conduct and close the contacts of their respective gate relays 32, 35, and 38, thereby coupling tones, $f_1$, $f_4$, and $f_7$ from oscillators 46, 49, and 52 to mixer circuit 61 where they are linearly summed by potentiometer 87 (see FIGURE 4) to form the desired unique composite interrogation signal for "commanding on" remote Station Number 264. This signal passes via conductor 66 to a suitable driver circuit 67. In driver circuit 67 it is amplifier and supplied to transmitter 68 where it modulates the carrier frequency to which the command receivers of all remote stations have been preset. The composite signal is produced for a period of time equal to the duty time selected for the one-shot multivibrator 63. A suitable time has been found to be approximately 15 seconds, but any desired time may be obtained by proper selection and adjustment of multivibrator 63. When multivibrator 63 returns to its stable state, it causes relay 64 to ground common line 65, causing all transistors 75 to cease conduction, thereby opening all gating relays 32 through 45 and completing one cycle of operation. A new call sign may then be entered on switch panels 11, 12, and 15, and another station interrogated. The device operates in a similar manner for each of the other call signs.

Many modifications and changes may be made by utilizing more or less tone generating and attendant switching and logic means, by utilizing punched card or tape controlled input switch means, by replacing certain elements and components with equivalent structures, or by changing component values for particular applications.

We claim:

1. An electronic interrogator for producing a plurality of unique tone coded electrical signals for selectively controlling a large group of remotely located devices comprising:

a plurality of oscillator means, each said oscillator means for producing an electrical tone of different frequency;

tone selecting means coupled to each of said oscillator means;

electrical mixer means for linearly summing a plurality of electrical tones of different frequency and producing therefrom a unique tone coded electrical signal, said mixer means having input means coupled to said tone selecting means for receiving said plurality of electrical tones therefrom and having output means for providing said unique tone coded electrical signal to a driver unit of a transmitter;

input control means coupled to said tone selecting means for causing said tone selecting means to select certain ones of said plurality of oscillator means for simultaneous coupling to said electrical mixer means; and modulation control means coupled to said tone selecting means for causing said tone selecting means to simultaneously couple said certain ones of said plurality of oscillator means to said electrical mixer means for a suitable period of time.

2. An electronic interrogator for producing a plurality of unique tone coded electrical signals for selectively controlling a large group of remotely located devices as set forth in claim 1 wherein said tone selecting means includes a selection matrix having a plurality of matrix sections therein equal in number to said plurality of oscillator means, said selection matrix being coupled to said input control means for receiving selection information therefrom, a plurality of oscillator gate circuits equal in number to said plurality of oscillator means, one each of said oscillator gate circuits being coupled to a corresponding one of said plurality of matrix sections for receiving selection information therefrom, and all of said plurality of oscillator gate circuits being coupled to said input control means for receiving additional selection information therefrom, and a plurality of gate relay means equal in number to said plurality of oscillator means, one each of said relay means having its control coil coupled to a corresponding one of said oscillator gate circuits, its input means coupled to a corresponding one of said oscillator means, and its output means coupled to said electrical mixer means.

3. An electronic interrogator for producing a plurality of unique tone coded electrical signals for selectively controlling a large group of remotely located devices as set forth in claim 1 wherein said electrical mixer means includes a plurality of said input means equal in number to said plurality of oscillator means, said plurality of said input means being coupled to said tone selecting means, and a summing potentiometer for linearly summing and adjusting in amplitude the oscillator signals received from said tone selecting means, said potentiometer having one end of its fixed resistance coupled to ground potential and the other end coupled via resistances of equal value to each of said plurality of mixer input means, and having its movable contact coupled to said output means of said electrical mixer means for providing said unique tone coded electrical signal to a driver unit of a transmitter.

4. An electronic interrogator for producing a plurality of unique tone coded electrical signals for selectively controlling a large group of remotely located devices as set forth in claim 2 wherein said electrical mixer means include a plurality of said input means equal in number to said plurality of oscillator means, each of said plurality of said input means being coupled to the output means of a respective one of said gate relay means, and a summing potentiometer for linearly summing and adjusting in amplitude the oscillator signals received from said tone selecting means, said potentiometer having one end of its fixed resistance coupled to ground potential and the other end coupled via resistances of equal value to each of said plurality of mixer input means, and having its movable contact coupled to said output means of said electrical mixer means for providing said unique tone coded electrical signal to a driver unit of a transmitter.

5. An electronic interrogator for producing a plurality of unique tone coded electrical signals for selectively controlling a large group of remotely located devices as set forth in claim 1 wherein said input control means includes a first group of switch input means, a second group of switch input means coupled to said first group in such manner that the output means of said second group include all possible switching combinations of the combined said first and second groups, said output means of said second group being coupled to said tone selecting means for supplying selection information thereto, and a third group of switch input means, bieng coupled to said tone selecting means for supplying additional selection information thereto.

6. An electronic interrogator for producing a plurality of unique tone coded electrical signals for selectively controlling a large group of remotely located devices as set forth in claim 2 wherein said input control means includes
a first group of switch input means,
a second group of switch input means coupled to said first group in such manner that the output means of said second group include all possible switching combinations of the combined said first and second groups, said output means of said second group being coupled to said selection matrix for supplying selection information thereto, and
a third group of switch input means, being coupled in common to each of said oscillator gate circuits for supplying additional selection information thereto.

7. An electronic interrogator for producing a plurality of unique tone coded electrical signals for selectively controlling a large group of remotely located devices as set forth in claim 4 wherein said input control means includes
a first group of switch input means,
a second group of switch input means coupled to said first group in such manner that the output means of said second group include all possible switching combinations of the combined said first and second groups, said output means of said second group being coupled to said selection matrix for supplying selection information thereto, and
a third group of switch input means, being coupled in common to each of said oscillator gate circuits for supplying additional selection information thereto.

8. An electronic interrogator for producing a plurality of unique tone coded electrical signals for selectively controlling a large group of remotely located devices as set forth in claim 1 wherein said modulation control means includes
a modulation control relay means coupled to said tone selecting means,
a multivibrator means coupled to the control coil of said modulation control relay means, and
a multivibrator control switch means coupled to said multivibrator means, for controlling the actuation thereof.

9. An electronic interrogator for producing a plurality of unique tone coded electrical signals for selectively controlling a large group of remotely located devices as set forth in claim 2 wherein said modulation control means includes
a modulation control relay means coupled in common to each of said plurality of oscillator gate circuits,
a multivibrator means coupled to the control coil of said modulation control relay means, and
a multivibrator control switch means coupled to said multivibrator means, for controlling the actuation thereof.

10. An electronic interrogator for producing a plurality of unique tone coded electrical signals for selectively controlling a large group of remotely located devices as set forth in claim 7 wherein said modulation control means includes
a modulation control relay means coupled in common to each of said plurality of oscillator gate circuits,
a multivibrator means coupled to the control coil of said modulation control relay means, and
a multivibrator control switch means coupled to said multivibrator means, for controlling the actuation thereof.

References Cited

UNITED STATES PATENTS

| | | | |
|---|---|---|---|
| 2,397,088 | 3/1946 | Clay. | |
| 2,840,797 | 6/1958 | Derr. | |
| 2,934,745 | 4/1960 | Kocmanek. | |
| 3,053,478 | 9/1962 | Davenport et al. | |
| 3,119,078 | 1/1964 | Stone | 331—38 |
| 3,140,468 | 7/1964 | Blaisdell et al. | 340—171 |
| 3,226,643 | 12/1965 | McNair | 340—171 XR |
| 3,242,480 | 3/1966 | Walker et al. | 340—351 |
| 3,263,141 | 7/1966 | Nicola. | |

DONALD J. YUSKO, Primary Examiner

U.S. Cl. X.R.

340—351